United States Patent
Kubonoya et al.

(10) Patent No.: US 8,068,965 B2
(45) Date of Patent: Nov. 29, 2011

(54) CONTROL APPARATUS AND METHOD FOR SHIFT-POSITION CHANGING MECHANISM

(75) Inventors: Hideki Kubonoya, Toyota (JP); Masato Kaigawa, Toyota (JP); Keiji Hoshino, Kariya (JP); Shigeru Kamio, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1084 days.

(21) Appl. No.: 11/907,296

(22) Filed: Oct. 10, 2007

(65) Prior Publication Data

US 2008/0103665 A1 May 1, 2008

(30) Foreign Application Priority Data

Oct. 27, 2006 (JP) ................ 2006-292918

(51) Int. Cl.
*G06F 19/00* (2011.01)
(52) U.S. Cl. ............... 701/59; 74/473.12; 74/473.21; 74/473.23; 74/473.31; 74/473.1; 477/154; 477/155; 477/123; 477/78; 477/49; 180/179
(58) Field of Classification Search ............... 701/59; 74/335, 336 R, 483 R, 473.12, 473.21, 473.23, 74/473.31, 473.1; 477/154, 155, 123, 78, 477/49; 180/179
See application file for complete search history.

(56) References Cited

U.S. PATENT DOCUMENTS

| | | | | |
|---|---|---|---|---|
| 6,052,644 | A * | 4/2000 | Murakami et al. | 701/93 |
| 6,116,110 | A * | 9/2000 | Maue et al. | 74/471 R |
| 6,522,024 | B1 * | 2/2003 | Takaoka et al. | 290/40 C |
| 7,314,427 | B2 * | 1/2008 | Sakai et al. | 477/116 |
| 7,828,695 | B2 * | 11/2010 | Inoue et al. | 477/34 |
| 2005/0075773 | A1 * | 4/2005 | Schweizer et al. | 701/51 |
| 2007/0117667 | A1 * | 5/2007 | Tamai et al. | 475/5 |
| 2008/0113848 | A1 * | 5/2008 | Inoue et al. | 477/98 |

FOREIGN PATENT DOCUMENTS

| | | |
|---|---|---|
| DE | 103 24 846 A1 | 1/2004 |
| JP | A-61-286664 | 12/1986 |
| JP | U-03-127921 | 12/1991 |
| JP | A-07-224922 | 8/1995 |
| JP | A 2002-323127 | 11/2002 |
| JP | A-2004-308848 | 11/2004 |
| JP | A 2005-106099 | 4/2005 |
| JP | A 2006-136035 | 5/2006 |

* cited by examiner

*Primary Examiner* — James Trammell
*Assistant Examiner* — McDieunel Marc
(74) *Attorney, Agent, or Firm* — Oliff & Berridge, PLC

(57) ABSTRACT

A control apparatus for a shift-position changing mechanism that changes the shift positions of an automatic transmission mounted in a vehicle using a rotational force of an actuator based on a signal corresponding to the state of an operation member, including: a mechanism that generates a rotational force for moving the actuator toward a rotation stop positional-range corresponding to the shift position, based on a rotation stop position of the actuator; a detection unit that detects a rotation amount of the actuator; a control unit that controls the actuator based on the signal and the detected rotation amount; and a learning unit that learns the rotation stop positional-range corresponding to the shift position, based on an amount by which the actuator has been rotated since a control over the actuator executed by the control unit is stopped.

20 Claims, 9 Drawing Sheets

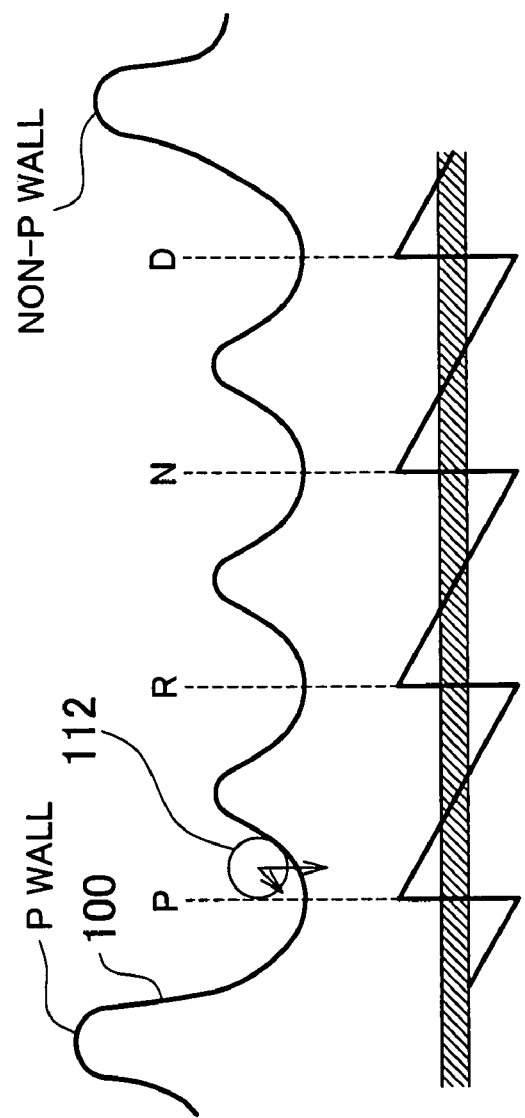

F I G . 4

| LEARNING CONDITION | | MOTOR ROTATIONAL DIRECTION | CALCULATION METHOD |
|---|---|---|---|
| TARGET POSITION COUNT VALUE HAS BEEN ACHIEVED AND STAND-BY STATE HAS BEEN ESTABLISHED (ELECTRIC POWER SUPPLY OF ALL PHASES OF MOTOR HAS BEEN SHUT OFF) | COUNT VALUE IS INCREASED (PLAY IS NOT PRESENT ON REVERSE ROTATION SIDE AND LEFT ON FORWARD ROTATION SIDE) | FORWARD ROTATIONAL DIRECTION | COUNT VALUE INDICATED BY COUNT SIGNAL AFTER STAND-BY STATE IS ESTABLISHED-COUNT VALUE CORRESPONDING TO P WALL POSITION |
| | COUNT VALUE IS DECREASED (PLAY IS NOT PRESENT ON FORWARD ROTATION SIDE AND LEFT ON REVERSE ROTATION SIDE) | REVERSE ROTATIONAL DIRECTION | COUNT VALUE INDICATED BY COUNT SIGNAL AFTER STAND-BY STATE IS ESTABLISHED-COUNT VALUE CORRESPONDING TO P WALL POSITION-COUNT VALUE CORRESPONDING TO PLAY |

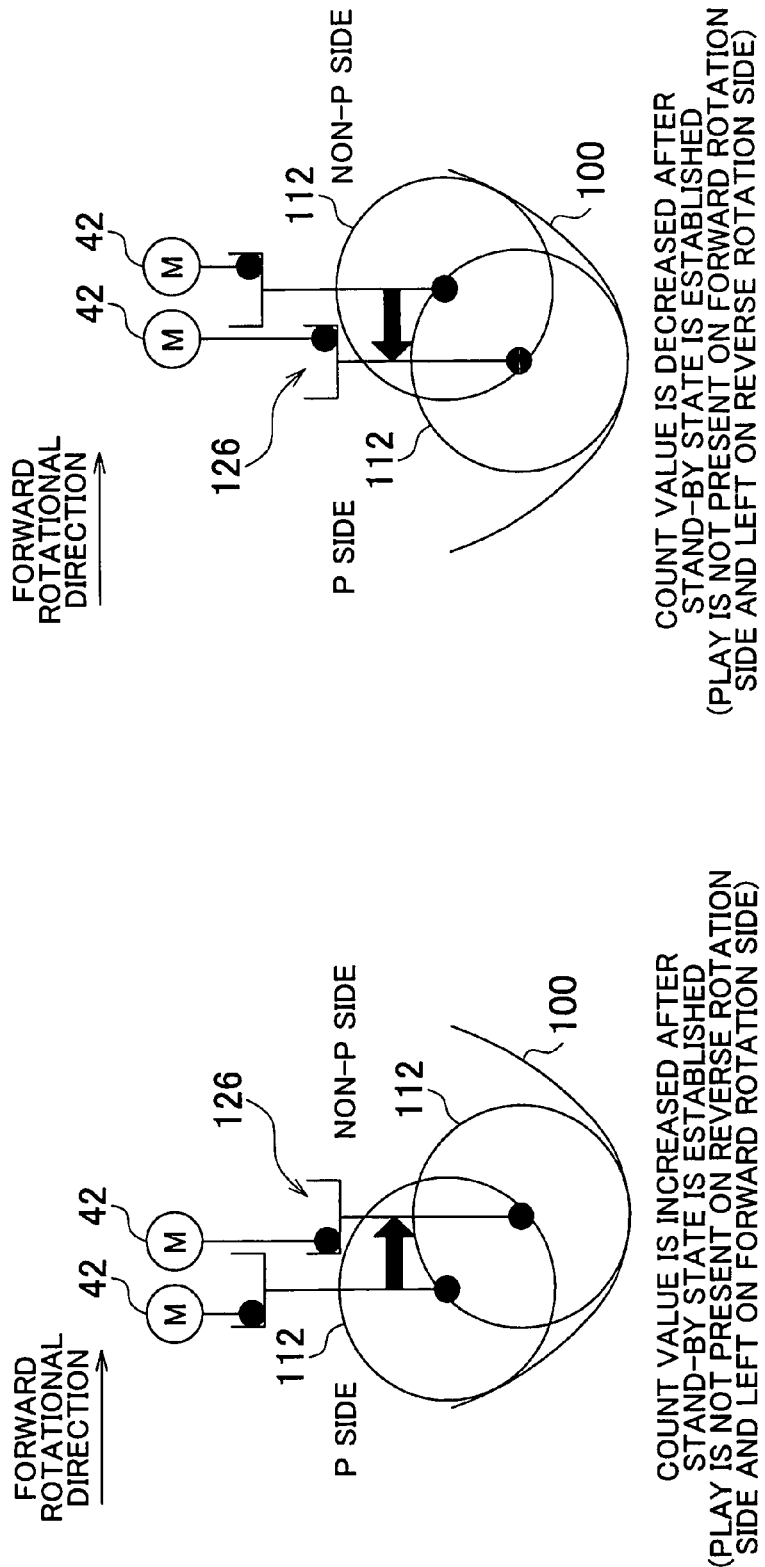

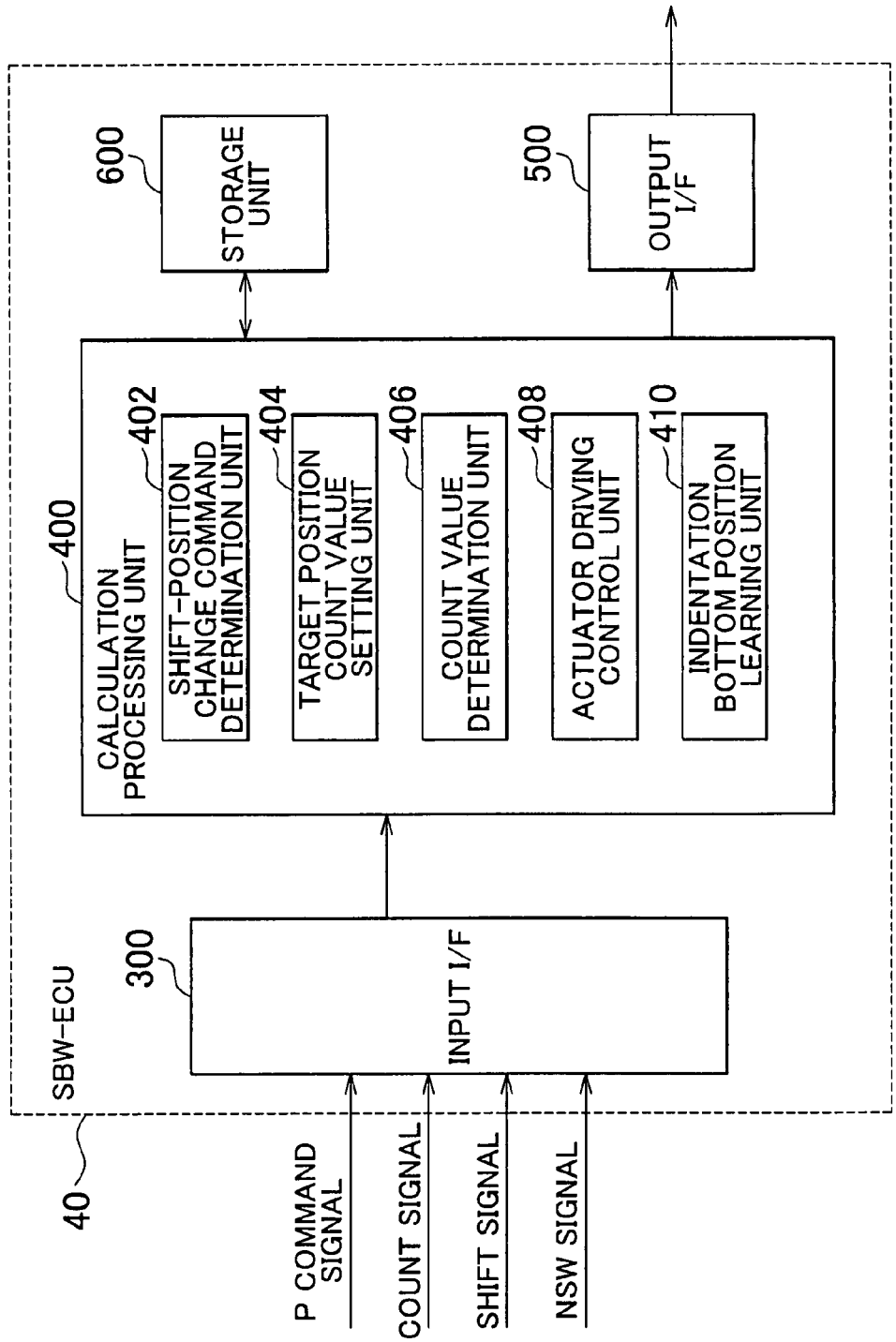

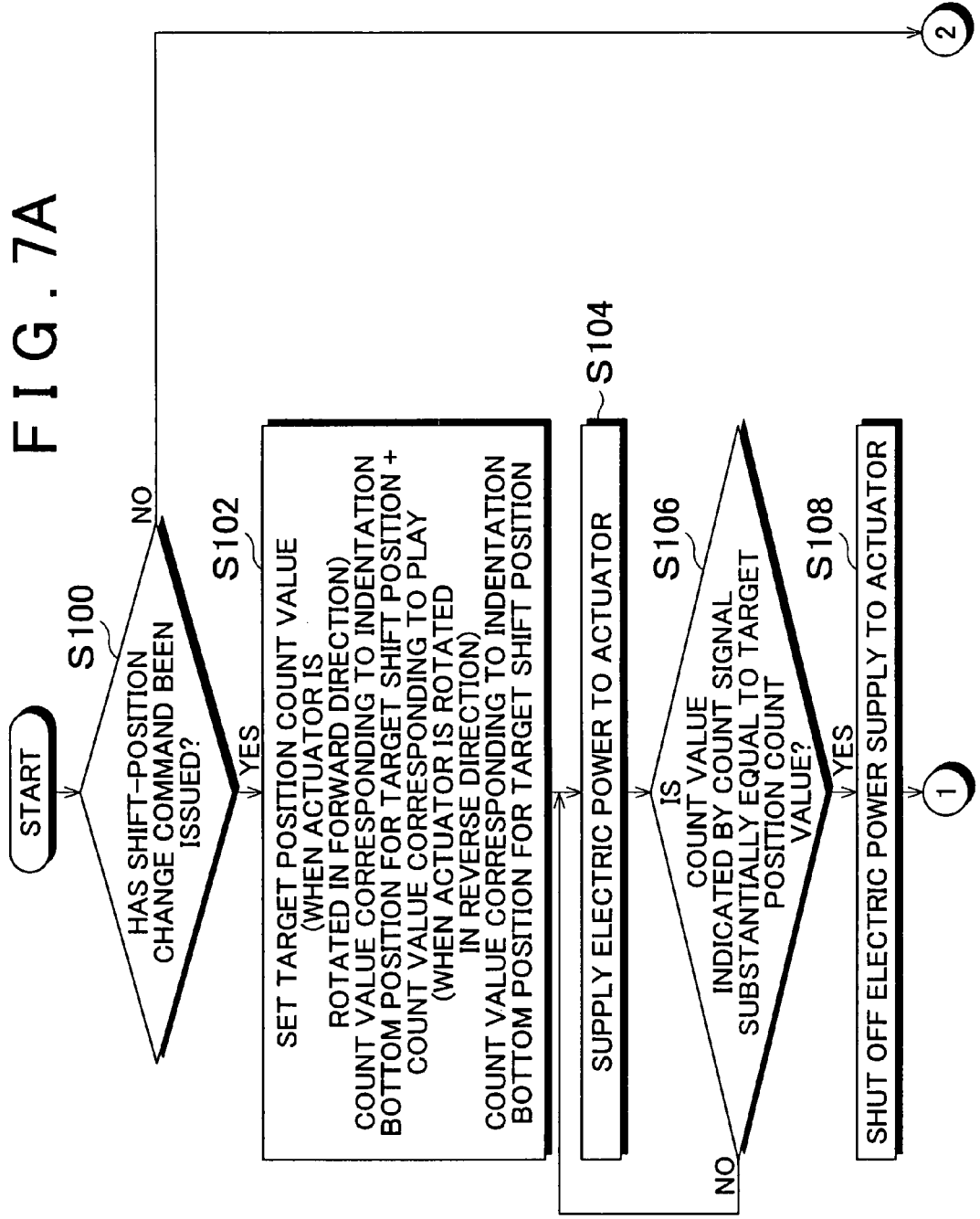

CONTROL APPARATUS AND METHOD FOR SHIFT-POSITION CHANGING MECHANISM

INCORPORATION BY REFERENCE

The disclosure of Japanese Patent Application No. 2006-292918 filed on Oct. 27, 2006 including the specification, drawings and abstract is incorporated herein by reference in its entirety.

BACKGROUND OF THE INVENTION

1. Field of the Invention

The invention relates generally to a control over a shift-position changing mechanism, and, more specifically, to a technology for learning a rotation stop positional-range of an actuator, which corresponds to a shift position, based on a change in a rotation stop position of the actuator when electric power is not supplied to the actuator.

2. Description of the Related Art

There is a shift-position changing mechanism, which changes shift positions (hereinafter, sometimes referred to as "shift ranges") of an automatic transmission in response to an operation of a shift lever performed by a driver, and which is provided with an electric motor (for example, a direct-current motor) as a power source for changing the shift positions.

With such shift-position changing mechanism, the shift lever and the shift-position changing mechanism need not be mechanically connected to each other, unlike a common changing mechanism that directly changes shift positions of an automatic transmission using an operating force applied to a shift lever by a driver. This eliminates the limitation on the layout of components in a vehicle, thereby providing greater flexibility to the vehicle design. In addition, the shift-position changing mechanism thus structured is more easily fitted to the vehicle.

An example of such mechanism is described in Japanese Patent Application Publication No. 2002-323127 (JP-A-2002-323127). A shift range changing device for an automatic transmission described in JP-A-2002-323127 determines the absolute position of an actuator and changes shift positions. The shift range changing device includes: a shift range changing mechanism that changes the shift range of the automatic transmission from among multiple shift ranges including Park; an actuator that serves as a power source for the shift range changing mechanism; control means for changing the shift range of the automatic transmission to the shift range instructed by a changing command, by driving the actuator according to the changing command issued in response to an operation externally performed; power supply means for supplying electric power to the control means; and nonvolatile rewritable storage means for storing the rotational position of the actuator and the shift range position of the automatic transmission. When electric power supply from the power supply means is once shut off and then started again, the control means reads the rotational position of the actuator and the shift range position of the automatic transmission, which are stored in the storage means when electric power supply is shut off, and sets these positions as initial values.

The shift range changing device described in JP-A-2002-323127 is able to determine the absolute position of the actuator, and change the shift ranges of the automatic transmission by driving a detent mechanism to allow the vehicle to start moving.

However, a shift-position changing mechanism usually includes a mechanism that generates an elastic force between mechanically connected components, using the deflection of the component, to maintain the rotational position of an actuator at the position corresponding to the shift position when electric power supply is shut off. Accordingly, the actuator sometimes receives a rotational force from the mechanism after electric power supply is shut off. As a result, the rotational position of the actuator is sometimes changed. In the shift range changing device described in JP-A-2002-323127, if the rotational position of the actuator changes after electric power supply is shut off, the actual rotational position of the actuator may deviates from the initial value corresponding to the shift range position stored in the storage means. This may deteriorate the accuracy of the control over the rotational position of the actuator.

SUMMARY OF THE INVENTION

The invention provides a control apparatus and method for a shift-position changing mechanism, which accurately detects a rotation stop positional-range of an actuator.

A first aspect of the invention relates to a control apparatus for a shift-position changing mechanism that changes the shift positions of an automatic transmission mounted in a vehicle using a rotational force of an actuator based on a signal corresponding to the state of an operation member. The control apparatus includes: a mechanism that generates a rotational force for moving the actuator toward the rotation stop positional-range corresponding to the shift position, based on a rotation stop position of the actuator; a detection unit that detects a rotation amount of the actuator, which is an amount by which the actuator is rotated by the rotational force of the actuator and the rotational force for moving the actuator toward the rotation stop positional-range corresponding to the shift position; a control unit that controls the actuator based on the signal and the detected rotation amount; and a learning unit that learns the rotation stop positional-range corresponding to the shift position, based on an amount by which the actuator has been rotated since a control over the actuator executed by the control unit is stopped. A second aspect of the invention relates to a control method for a shift-position changing mechanism, which includes steps that correspond to the elements of the control apparatus according to the first aspect of the invention.

With the control apparatus and method for a shift-position changing mechanism according to the aspects described above, the rotational force for moving the actuator toward the rotation stop positional-range corresponding to the shift position is generated based on the rotation stop position of the actuator. When the control over the actuator is stopped and electric power supply to the actuator is shut off, if the rotation stop position of the actuator is not within the rotation stop positional-range corresponding to the shift position, the rotation stop position of the actuator is brought within the rotation stop positional-range corresponding to the shift position by the rotational force for moving the actuator toward the rotation stop positional-range corresponding to the shift position. The rotation stop position of the actuator after such a change is within the rotation stop positional-range corresponding to the shift position. The rotation stop positional-range corresponding to the shift position is learned based on the amount by which the actuator has been rotated since the control over the actuator is stopped. In this way, the rotation stop positional-range corresponding to the shift position is accurately detected. As a result, the control over the rotation stop position of the actuator is executed more accurately. It is therefore possible to provide the control apparatus and method for a shift-position changing mechanism, which accurately detects the rotation stop position of the actuator.

BRIEF DESCRIPTION OF THE DRAWINGS

The foregoing and further objects, features and advantages of the invention will become apparent from the following description of an embodiment with reference to the accompanying drawings, wherein the same or corresponding portions will be denoted by the same reference numerals and wherein:

FIGS. 3A and 3B show a manner in which the drawing rotational force changes as a roller moves along a wavelike portion of a detent plate;

FIG. 4 is a table showing learning conditions and calculation methods for an indentation bottom position according to the embodiment of the invention;

FIGS. 5A and 5B are views each showing the state of a play based on the direction in which the drawing rotational force is directed;

FIG. 6 is a functional block diagram of an SBW-ECU according to the embodiment of the invention;

FIGS. 7A and 7B shows a flowchart of the routine executed by the SBW-ECU according to the embodiment of the invention.

DETAILED DESCRIPTION OF THE EMBODIMENT

Figure 1:
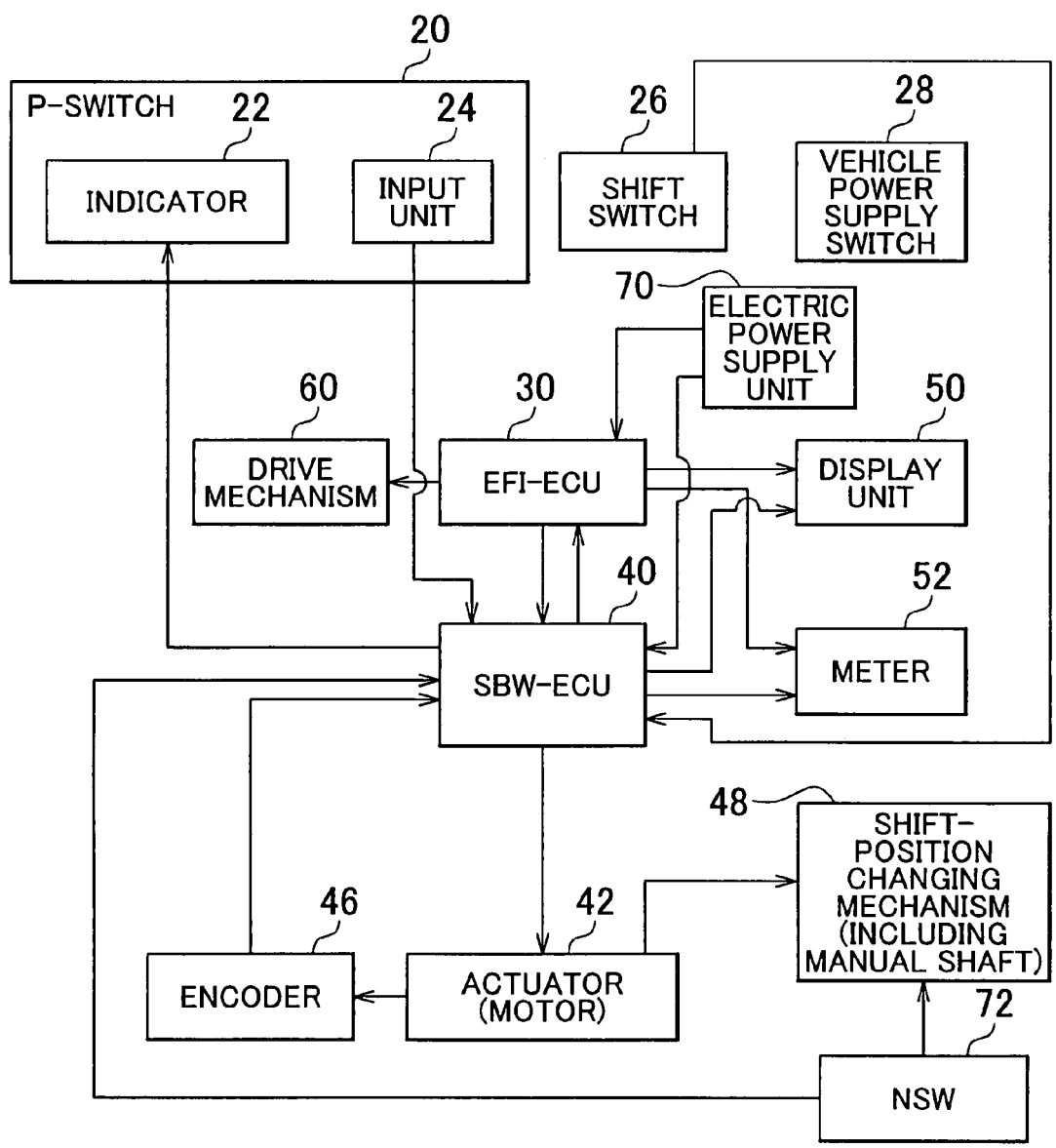
FIG. 1 is a view showing the structure of a control system for a shift-position changing mechanism according to an embodiment of the invention.

Hereafter, an embodiment of the invention will be described with reference to the accompanying drawings. In the description below, the same or corresponding components and steps will be denoted by the same reference numerals. The functions and the names of the components and steps having the same reference numerals are also the same. Accordingly, detailed description on the components and steps having the same reference numerals will be provided only once below.

FIG. 1 shows the structure of a shift control system 10 including a control apparatus for a shift-position changing mechanism 48 according to the embodiment of the invention. The shift control system 10 is used to change the shift positions for a vehicle. The shift control system 10 includes a P-switch 20, a shift switch 26, a vehicle power supply switch 28, a vehicle control unit (hereinafter, referred to as an "EFI-ECU (Electronic Control Unit)") 30, a parking control unit (hereinafter, referred to as a "SBW (Shift-by-Wire)-ECU") 40, an actuator 42, an encoder 46, a shift-position changing mechanism 48, a display unit 50, a meter 52, a drive mechanism 60, an electric power supply unit 70, and a neutral start switch (hereinafter, referred to as an "NSW") 72. The shift control system 10 functions as a "Shift-by-Wire" system that changes the shift positions under electric control. More specifically, the shift-position changing mechanism 48 is driven by the actuator 42 to change the shift positions. The control apparatus for the shift-position changing mechanism 48 is implemented by the SBW-ECU 40.

The vehicle power supply switch 28 is used to change the on/off state of an electric power supply for a vehicle. Any type of switch, for example, an ignition switch may be employed as the vehicle power supply switch 28. An instruction that the vehicle power supply switch 28 receives from, for example, a driver is transmitted to the electric power supply unit 70.

The electric power supply unit 70 supplies electric power to at least one of the EFI-ECU 30 and the SBW-ECU 40 from an auxiliary battery (not shown) according to an instruction from the vehicle power supply switch 28. The electric power supply unit 70 supplies electric power only to the EFI-ECU 30, supplies electric power only to the SBW-ECU 40, or supplies electric power to both the EFI-ECU 30 and the SBW-ECU 40 based on, for example, the vehicle state. The electric power supply unit 70 may be implemented by hardware. Alternatively, the electric power supply unit 70 may be implemented by software.

Accordingly, when the vehicle power supply switch 28 is turned on, electric power is supplied from the auxiliary battery (not shown) and the shift control system 10 is activated.

The P-switch 20 is used to change the shift position between Park (hereinafter, referred to as "P") and Non-Park (hereinafter, referred to as "Non-P"). The P-switch 20 includes an indicator 22 that indicates the current shift position (P or Non-P) to the driver, and an input unit 24 that receives an instruction from the driver. The driver inputs an instruction to change the shift position to P in the P-switch 20 through the input unit 24. The input unit 24 may be a momentary switch. The instruction from the driver, which is received by the input unit 24, is transmitted to the SBW-ECU 40. A component other than the P-switch 20 may be used to change the shift position from Non-P to P.

The SBW-ECU 40 controls the actuator 42 that drives the shift-position changing mechanism 48 to change the shift position between P and Non-P. The SBW-ECU 40 causes the indicator 22 to indicate the current shift position (P or Non-P). If the driver presses the input unit 24 when the shift position is in Non-P, the SBW-ECU 40 changes the shift position to P, and causes the indicator 22 to indicate that the current shift position is in P.

The actuator 42 is formed of a switched reluctance motor (hereinafter, referred to as a "SR motor"). The actuator 42 receives an actuator control signal from the SBW-ECU 40, and drives the shift-position changing mechanism 48. The encoder 46 rotates together with the actuator 42, and detects the rotational state of the SR motor. The encoder 46 is a rotary encoder that outputs an A-phase signal, a B-phase signal and a Z-phase signal. The SBW-ECU 40 receives a signal from the encoder 46 to determine the rotational state of the SR motor, and controls a supply of electric power used to drive the SR motor.

The shift switch 26 is used to change the shift position to Drive (hereinafter, referred to as D), Reverse (hereinafter, referred to as R), or Neutral (hereinafter, referred to as N). When the shift position is in P, the shift switch 26 is used to change the shift position from P to Non-P. An instruction from the driver, which is received by the shift switch 26, is transmitted to the SBW-ECU 40. The shift switch 26 transmits a shift signal, indicating the shift position corresponding to the position of an operation member (for example, a shift lever), which is selected in response to the operation by the driver, to the SBW-ECU 40. The SBW-ECU 40 executes, using the EFI-ECU 30, the control to change the shift positions in the drive mechanism 60 in accordance with the shift signal indicating the instruction from the driver, and causes the meter 52 to indicate the current shift position. The drive mechanism 60 may be formed of a multi-speed speed-change mechanism. Alternatively, the drive mechanism 60 may be formed of a continuously variable speed-change mechanism.

The EFI-ECU 30 comprehensively controls the operation of the shift control system 10. The display unit 50 indicates an instruction, an alert, etc. provided from the EFI-ECU 30 or the SBW-ECU 40 to the driver. The meter 52 indicates the conditions of the vehicle components and the current shift position.

The NSW 72 is provided at the end of the shaft 102, and transmits a NSW signal indicating the shift position corresponding to the position at which the shaft 102 stops rotating (hereinafter, referred to as the "rotation stop position of the shaft 102") to the SBW-ECU 40.

Figure 2:
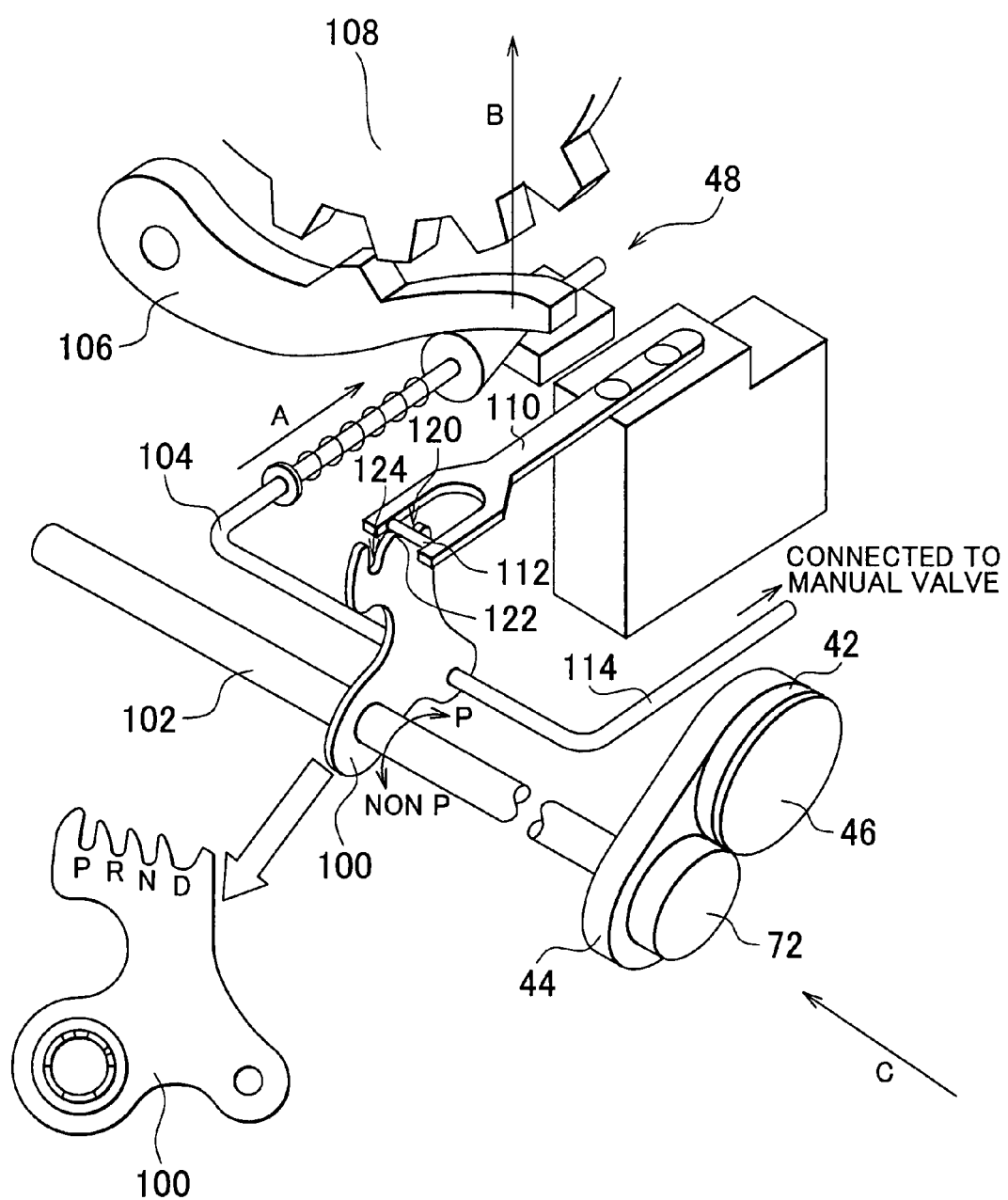
FIG. 2 is a view showing the structure of the shift-position changing mechanism.

FIG. 2 shows the structure of the shift-position changing mechanism 48. The shift positions include P and Non-P including R, N, and D. Non-P may include, in addition to D, D1 at which first gear is always selected and D2 at which second gear is always selected.

The shift-position changing mechanism 48 includes a shaft 102 that is rotated by the actuator 42, a detent plate 100 that rotates along with the shaft 102, rods 104 and 114 that operate in accordance with the rotation of the detent plate 100, a parking lock gear 108 that is fixed to the output shaft of a transmission (not shown), a parking lock gear locking pawl 106 that is used to lock the parking lock gear 108, a detent spring 110 that restricts the rotation of the detent plate 100 to fix the shift position at a predetermined shift position, and a roller 112. The detent plate 100 functions as a restriction member according to the invention.

The actuator 42 is connected to the shaft 102 via a speed-reduction mechanism 44. The rotational speed of the actuator 42 is reduced by the speed-reduction mechanism 44, and the rotation having a reduced speed is transferred to the shaft 102. The speed reduction mechanism 44 is formed of, for example, a plurality of gears. The encoder 46 is fitted to the actuator 42. The encoder 46 increases the count value, as the amount by which the actuator 42 is rotated (hereinafter, referred to as the "rotation amount of the actuator 42") increases (when the actuator 42 rotates in the reverse direction, the encoder 46 decreases the count value). A count signal indicating the count value is transmitted from the encoder 46 to the SBW-ECU 40. The SBW-ECU 40 detects the rotation amount of the actuator 42 based on the amount of an increase or a decrease in the count value. Alternatively, the SBW-ECU 40 may detect the rotation amount of the shaft 102 based on the amount of an increase or a decrease in the count value and the speed reduction ratio at the speed reduction mechanism 44.

The NSW 72 provided at the end of the shaft 102 has multiple switches corresponding to the respective shift positions. One of the multiple switches is turned on based on the rotation stop position of the shaft 102. When receiving a NSW signal indicating the switch that has been turned on, the SBW-ECU 40 determines the shift position selected by the shift-position changing mechanism 48 based on the NSW signal.

The detent plate 100 is driven by the actuator 42 to change the shift positions. The encoder 46 functions as counting means for obtaining a count value corresponding to the rotation amount of the actuator 42.

In the perspective view in FIG. 2, only two of the indentations formed in the detent plate 100 (an indentation 124 corresponding to P and an indentation 120 corresponding to one of Non-P) are shown. However, the detent plate 100 actually has four indentations corresponding to D, N, R and P, as shown in the enlarged plane view of the detent plate 100 in FIG. 2. Changing of the shift position between P and Non-P will be described below. However, the invention is not limited to changing of the shift position between P and Non-P.

FIG. 2 shows the state in which the shift position is in Non-P. In this state, because the parking lock gear locking pawl 106 does not lock the parking lock gear 108, the rotation of the drive shaft of the vehicle is not interfered with. If the shaft 102 is then rotated in the clockwise direction, when viewed in the direction of the arrow C, by the actuator 42, the rod 104 is pressed via the detent plate 100 in the direction of the arrow A in FIG. 2, whereby the parking lock gear locking pawl 106 is pushed up in the direction of the arrow B in FIG. 2 by a tapered portion provided at the tip of the rod 104. As the detent plate 100 rotates, the roller 112 of the detent spring 110, which is positioned at one of the two indentations formed at the top portion of the detent plate 100, namely, the indentation 120 corresponding to Non-P, climbs over a crest 122 and moves into the other indentation, namely, the indentation 124 corresponding to P. The roller 112 is fitted to the detent spring 110 so as to be rotatable about its axis. When the detent plate 100 rotates until the roller 112 reaches the indentation 124 corresponding to P, the parking lock gear locking pawl 106 is pushed up to a position at which the projection of the parking lock gear locking pawl 106 is placed between the teeth of the parking lock gear 108. Thus, the drive shaft of the vehicle is mechanically fixed, and the shift position is changed to P.

In the shift control system 10, the SBW-ECU 40 controls the rotation amount of the actuator 42 so that the impact caused when the roller 112 of the detent spring 110 drops into an indentation after climbing over the crest 122 is reduced to reduce the load placed on the components of the shift-position changing mechanism 48, such as the detent plate 100, the detent spring 110 and the shaft 102.

The SBW-ECU 40 determines that the shift position is in P, when the rotation stop position of the actuator 42, which is determined based on the rotation amount of the actuator 42 detected by the encoder 46, namely, the position of the roller 112 relative to the detent plate 100 is within the predetermined range corresponding to P.

On the other hand, when the rotation stop position of the actuator 42, which is determined based on the rotation amount of the actuator 42 detected by the encoder 46, is within the predetermined range corresponding to Non-P, the SBW-ECU 40 determines that the shift position is in Non-P. The SBW-ECU 40 may determine the shift position corresponding to the rotation stop position of the shaft 102 based on a NSW signal from the NSW 72.

The detent plate 100 or the shaft 102 is ultimately connected via the rod 114 to a spool (not shown) of a manual valve (not shown) of the automatic transmission. When the rotation stop position of the actuator 42 matches a position corresponding to any one of D, R, and N, the spool of the manual valve is moved to a position corresponding to the shift position indicated by the rotation stop position of the actuator 42. Thus, the shift positions of the automatic transmission is changed by the actuator 42. The SBW-ECU 40 sets the rotation stop positional-range corresponding to each shift position based on the rotation amount of the actuator 42, which is restricted by the detent plate 100.

In the shift control system 10 having the structure described above, after the SBW-ECU 40 stops the control over the actuator 42, the rotation stop position of the actuator 42 sometimes changes. The following description will be provided on the assumption that, when the control over the actuator 42 is stopped, the roller 112 on the detent plate 100 is at a position outside the rotation stop positional-range corresponding to a shift position, more specifically, the roller 112 is at a position that deviates from an indentation bottom position.

FIG. 3A shows a wavelike portion of the detent plate 100, and the roller 112 that contacts the detent plate 100. In the case shown in FIG. 3A, the control over the actuator 42 is stopped when the roller 112 is at a position that deviates from the indentation bottom position corresponding to P in the detent plate 100. Such positional deviation is caused due to the size tolerance of the detent plate 100.

The roller 112 is pressed to the detent plate 100 that contacts the roller 112 by an elastic force generated by the deflection of the detent spring 110. When the force for moving the roller 112 toward an indentation bottom position of the detent plate 100, which is a portion of the force for pressing the roller 112 to the detent plate 100, exceeds the friction of the rotational elements connected to the detent plate 100, a rotational force is applied in the direction in which the roller 112 moves toward the indentation bottom position of the detent plate 100. Thus, the rotation stop position of the actuator 42 changes after the control over the actuator 42 is stopped. In the description below, such a change in the rotation stop position will be referred to as "drawing" of the roller 112 to the indentation bottom position. The rotational force due to drawing of the roller 112 to an indentation bottom position (hereinafter, referred to as the "drawing rotational force") corresponds to "the rotational force for moving the actuator toward the rotation stop positional-range corresponding to a shift position" according to the invention.

FIG. 3B shows the manner in which the drawing rotational force changes as the roller 112 moves along the wavelike portion of the detent plate 100. In FIG. 3B, the shaded portion shows the friction, and the solid line shows the manner in which the drawing rotational force changes. In the region in which there are both the shaded portion and the solid line, the friction exceeds the drawing rotational force. Accordingly, the drawing rotational force exceeds the friction in the region other than the region in which there are both the shaded portion and the solid line. Therefore, if electric power supply to the actuator 42 is shut off when the roller 112 is in the region other than the region in which there are both the shaded portion and the solid line in FIG. 3B, the roller 112 is moved to the closest indentation bottom position by the drawing rotational force.

The wavelike portion of the detent plate 100 and the detent spring 110, to which the roller 112 is connected, constitute a mechanism that generates the drawing rotational force for moving the roller 112 toward the indentation bottom position based on the rotation stop position of the actuator 42.

The SBW-ECU 40 learns the indentation bottom position based on the amount by which the actuator 42 has been rotated since the control over the actuator 42 is stopped.

More specifically, the SBW-ECU 40 stops the control over the actuator 42 by shutting off electric power supply to the actuator 42, and then learns the indentation bottom position based on the amount by which the actuator 42 has been rotated since the control over the actuator 42 is stopped, and which is detected by the encoder 46.

The SBW-ECU 40 learns the indentation bottom positions within the wavelike portion of the detent plate 100 that restricts the rotation range of the actuator 42, namely, the range in which the encoder 46 detects the rotation amount of the actuator 42 using the P wall position or the non-P wall position in the detent plate 100 as the reference. In the embodiment of the invention, the encoder 46 detects the rotation amount of the actuator 42 using the P wall position in the detent plate 100 as the reference, and the SBW-ECU 40 learns the indentation bottom positions based on the rotation amount.

The SBW-ECU 40 learns the indentation bottom position according to the calculation method selected depending on the rotational direction of the actuator 42, when the learning condition shown in FIG. 4 is satisfied.

The SBW-ECU 40 determines that a command to change the shift positions has been issued, when the shift position, which has been selected by the shift-position changing mechanism 48 and which is determined by the encoder 46 or the NSW 72, differs from the shift position corresponding to the shift lever position.

The SBW-ECU 40 sets the target position count value for the indentation bottom position corresponding to the shift position instructed by the shift lever position. The SBW-ECU 40 detects the rotation amount of the actuator 42 based on the count value indicated by the count signal from the encoder 46. The SBW-ECU 40 controls the actuator 42 such that the count value indicated by the count signal from the encoder 46 matches the target position count value. When the count value indicated by the count signal from the encoder 46 becomes substantially equal to the target position count value, the SBW-ECU 40 shuts off electric power supply to the actuator 42 to stop the control over the actuator 42. In the description below, the state in which the control over the actuator 42 is not executed will be referred to as the "stand-by state". As the target position count values for the respective shift positions, the respective count values for the indentation bottom positions are set.

As shown in FIG. 4, when the learning condition is satisfied, the SBW-ECU 40 recalculates the count value for the indentation bottom position according to the calculation method selected depending on the rotational direction of the actuator 42. The learning condition is satisfied, when one of the following states is established: the state in which the stand-by state has been established and the count value indicated by the count signal from the encoder 46 is increased; and the state in which the condition that the stand-by state has been established and the count value based on the count signal from the encoder 46 is decreased.

For example, when the count value increases after the stand-by state is established, the roller 112 is moved to the indentation bottom position, as indicated by the arrow, in the state in which a play 126 between the actuator 42 and the detent plate 100 is not present on the reverse rotation side, as shown in FIG. 5A. In FIGS. 5A and 5B, the actuator 42 and the play 126 between the actuator 42 and the detent plate 100 are shown on the same side on which there is the roller 112, for convenience of description.

In this case, the count value corresponding to the indentation bottom position when the P wall position of detent plate 100 is used as the reference is calculated by subtracting the count value corresponding to the P wall position from the count value after the stand-by state is established, as shown in FIG. 4.

When the count value is decreased after the stand-by state is established, the roller 112 moves to the indentation bottom position, as indicated by the arrow, in the state in which the play 126 is not present on the forward rotation side, as shown in FIG. 5B.

In this case, the count value corresponding to the indentation bottom position when the P wall position is used as the reference is calculated by subtracting the count value corresponding to the P wall position and the count value corresponding to the play 126 from the count value after the stand-by state is established.

FIG. 6 is a functional block diagram of the SBW-ECU 40.

The SBW-ECU 40 includes an input interface (hereinafter, referred to as an "input I/F") 300, a calculation processing unit 400, a storage unit 600, and an output interface (hereinafter, referred to as an "output I/F") 500.

The input I/F 300 receives a P command signal from the P switch 20, a count signal from the encoder 46, a shift signal from the shift switch 26, and a NSW signal from the NSW 72, and transmits these signals to the calculation processing unit 400.

The calculation processing unit 400 includes a shift-position change command determination unit 402, a target position count value setting unit 404, a count value determination unit 406, an actuator driving control unit 408, and an indentation bottom position learning unit 410.

The shift-position change command determination unit 402 determines whether a command to change the shift positions has been issued. The shift-position change command determination unit 402 determines that a command to change the shift positions has been issued, when the shift position corresponding to the shift signal from the shift switch 26 differs from the shift position selected by the shift-position changing mechanism 48.

The shift position selected by the shift-position changing mechanism 48 is the shift position indicated by the NSW signal from the NSW 72 or the shift position determined based on the count value indicated by the count signal from the encoder 46.

The shift-position change command determination unit 402 may set the shift change command determination flag when it is determined that a command to change the shift positions has been issued.

The target position count value setting unit 404 sets the target position count value. The target position count value setting unit 404 sets the count value corresponding to the target shift position, using the shift position indicated by the shift signal from the shift switch 26 as the target shift position. When the target position count value is set based on a relative count value, the target position count value may be set to the count value from the count value corresponding to the shift position selected by the shift-position changing mechanism 48 to the count value corresponding to the target shift position.

The target position count value setting unit 404 changes the method for setting the target position count value depending on the rotational direction of the actuator 42, which is determined based on the positional relationship between the shift position selected by the shift-position changing mechanism 48 and the target shift position.

When the actuator 42 is rotated in the forward direction, the target position count value setting unit 404 sets the target position count value by adding the count value corresponding to the amount of play to the count value corresponding to the target shift position.

When the actuator 42 is rotated in the reverse direction, the target position count value setting unit 404 sets the count value corresponding to the target shift position as the target position count value.

The count value determination unit 406 determines whether the count value indicated by the count signal from the encoder 46 is substantially equal to the target position count value set by the target position count value setting unit 404. The count value determination unit 406 determines that the count value indicated by the count signal is substantially equal to the target position count value, when the difference between the count value indicated by the count signal and the target position count value is within a predetermined range. The count value determination unit 406 may set the count value determination flag, when it is determined that the count value indicated by the count signal is substantially equal to the target position count value.

The actuator driving control unit 408 transmits a drive control signal to the actuator 42 via the output I/F 500, when the target position count value setting unit 404 sets the target position count value. When the count value indicated by the count signal from the encoder 46 becomes substantially equal to the target position count value, the actuator driving control unit 408 stops electric power supply to the actuator 42, that is, the actuator driving control unit 408 stops the control over the actuator 42. The actuator driving control unit 408 may stop the control over the actuator 42, when the count value determination flag is set.

The indentation bottom position learning unit 410 learns the indentation bottom position based on the count value detected by the encoder 46 after the control over the actuator 42 is stopped. More specifically, the indentation bottom position learning unit 410 recalculates the count value corresponding to the indentation bottom position according to the calculation method selected depending on whether the count value is increased or decreased after the stand-by state is established, as described above. The recalculated count value corresponding to the indentation bottom position is set as the target position count value that will be used in the subsequent routines. The amount of play that is empirically obtained in advance may be used. Alternatively, the amount of play learned according to a known method may be used.

The following description will be provided on the assumption that each of the shift-position change command determination unit 402, the target position count value setting unit 404, the count value determination unit 406, the actuator driving control unit 408, and the indentation bottom position learning unit 410 may be implemented by software that is realized by executing a program stored in the storage unit 600 of the CPU (Central Processing Unit) that is the calculation processing unit 400. Alternatively, each of these units may be implemented by hardware. These programs are stored in the recording medium mounted in the vehicle.

The storage unit 600 stores various information, programs, threshold values, maps, etc. The calculation processing unit 400 reads the data from the storage unit 600 or stores the data in the storage unit 600, when necessary.

Figure 7B:
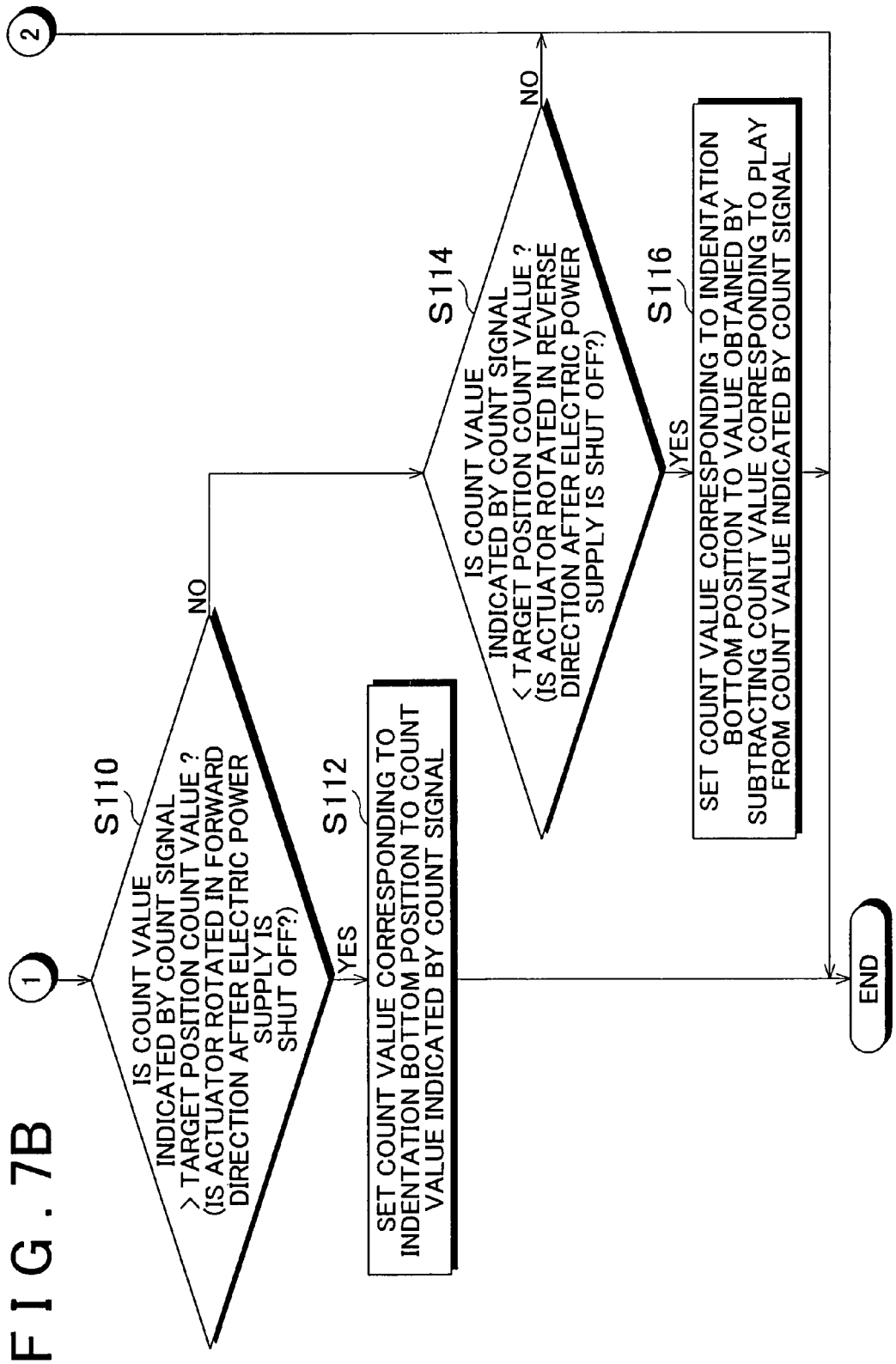

Hereafter, the routine executed by the SBW-ECU 40 will be described with reference to FIGS. 7A and 7B.

In step (hereinafter, step will be simply referred to as "S") 100, the SBW-ECU 40 determines whether a command to change the shift positions has been issued. When it is determined that a command to change the shift positions has been issued ("YES" in S100), step S102 is executed. On the other hand, when it is determined that a command to change the shift positions has not been issued ("NO" in S100), the routine ends.

In S102, the SBW-ECU 40 sets the target position count value. The SBW-ECU 40 sets the target position count value to the value obtained by adding the count value corresponding to the play to the count value corresponding to the indentation bottom position for the target shift position, when the actuator 42 is rotated in the forward direction to select the target shift position. The SBW-ECU 40 sets the target position count value to the count value corresponding to the indentation bottom position for the target shift position, when the actuator 42 is rotated in the reverse direction to select the target shift position.

In S104, the SBW-ECU 40 supplies electric power to the actuator 42.

In S106, the SBW-ECU 40 determines whether the count value indicated by the count signal from the encoder 46 is substantially equal to the target position count value. When it is determined that the count value indicated by the count signal from the encoder 46 is substantially equal to the target position count value ("YES" in S106), S108 is executed. On the other hand, when it is determined that the count value indicated by the count signal from the encoder 46 is not substantially equal to the target position count value ("NO" in S106), S104 is executed again.

In S108, the SBW-ECU 40 shuts off electric power supply to the actuator 42.

In S110, the SBW-ECU 40 determines whether the count value indicated by the count signal from the encoder 46 is larger than the target position count value. When it is determined that the count value indicated by the count signal is larger than the target position count value ("YES" in S110), S112 is executed. On the other hand, when it is determined that the count value indicated by the count signal is equal to or smaller than the target position count value ("NO" in S110), S114 is executed.

In S112, the SBW-ECU 40 sets the count value corresponding to the indentation bottom position for the target shift position to the count value indicated by the count signal from the encoder 46. The SBW-ECU 40 updates the count value corresponding to the indentation bottom position for the target shift position, which is stored in the memory.

In S114, the SBW-ECU 40 determines whether the count value indicated by the count signal from the encoder 46 is smaller than the target position count value. When it is determined that the count value indicated by the count signal from the encoder 46 is smaller than the target position count value ("YES" in S114), S116 is executed. On the other hand, when it is determined that the count value indicated by the count signal from the encoder 46 is equal to or larger than the target position count value ("NO" in S114), the routine ends.

In S116, the SBW-ECU 40 sets the count value corresponding to the indentation bottom position for the target shift position to the value obtained by subtracting the count value corresponding to the play from the count value indicated by the count signal from the encoder 46. The SBW-ECU 40 updates the count value corresponding to the indentation bottom position for the target shift position, which is stored in the memory.

Figure 8:
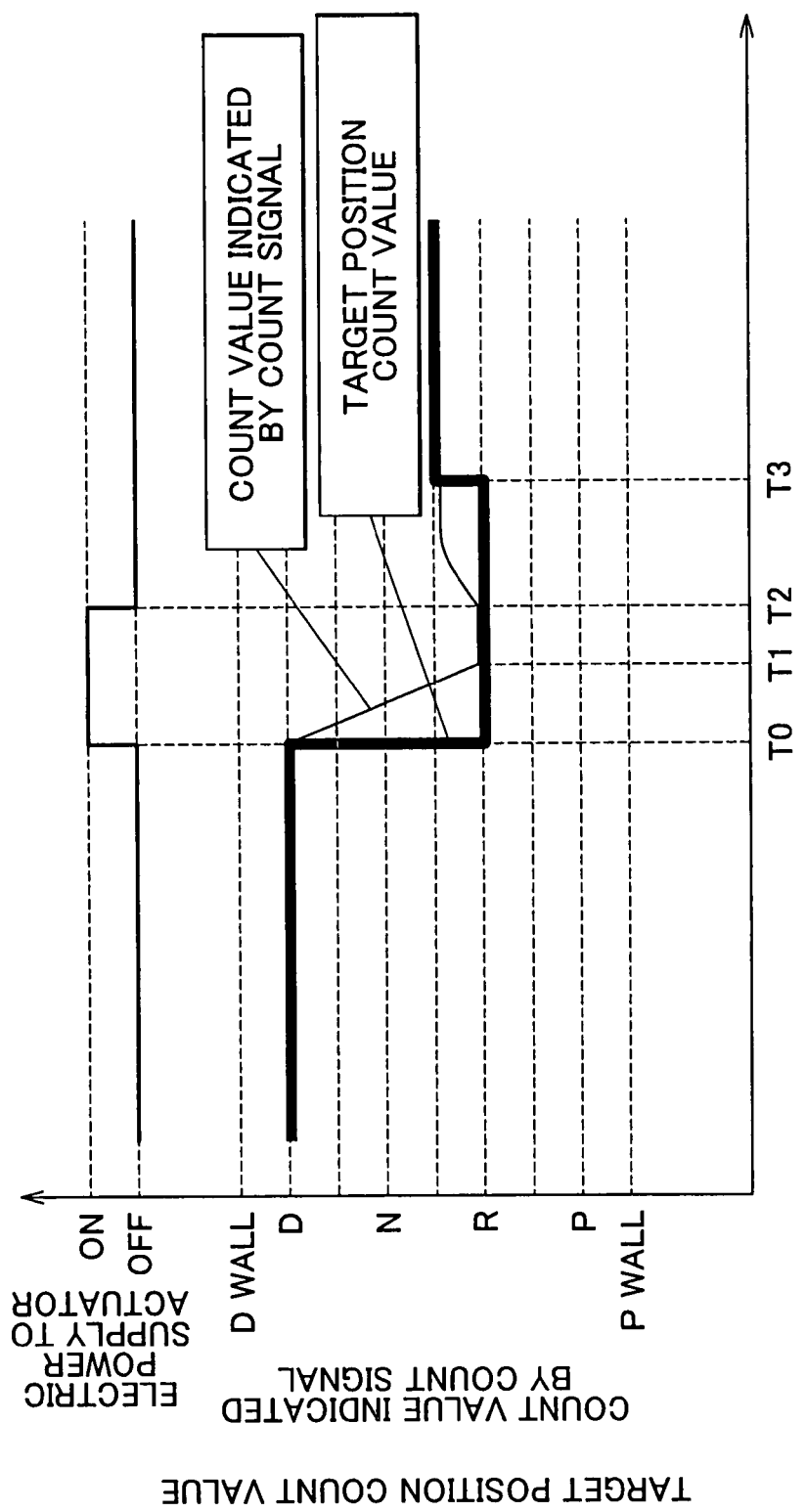
FIG. 8 is a timing chart showing the operation of the SBW-ECU according to the embodiment of the invention.

The operation of the SBW-ECU 40 will be described with reference to FIG. 8. The SBW-ECU 40 has the above-described structure and executes the above-described routine. In FIG. 8, the vertical axis represents the target position count value, the count value indicated by the count signal, and the state of electric power supply to the actuator.

When the shift position selected by the shift-position changing mechanism 48 is D, if the shift lever position is also D, the target position count value is substantially equal to the count value indicated by the count signal. At this time, the actuator 42 is not operating (off).

If the driver moves the shift lever to R at time T0, a command to change the shift positions is issued ("YES" in S100), and the target position count value is set according to the command, as indicated by the thick line in FIG. 8 (S102). In this case, because the actuator 42 is rotated in the reverse direction, the target position count value is set to the count value corresponding to the indentation bottom position. Then, electric power is supplied to the actuator 42 (S104), and the actuator 42 starts rotating the detent plate 100.

As shown by the thin line in FIG. 8, the count value decreases as the actuator 42 rotates. When the count value becomes substantially equal to the target position count value at time T1 ("YES" in S106), the rotation stop position of the actuator 42 is maintained. Then, electric power supply is shut off at time T2 (S108), and the stand-by state is established.

When electric power supply to the actuator 42 is shut off at the target position count value, if the roller 112 is at a position that deviates from the indentation bottom position and also able to be drawn to the indentation bottom position, the detent plate 100 rotates such that the roller 112 is moved to the indentation bottom position by the drawing rotational force. When the roller 112 reaches the indentation bottom position, rotation of the detent plate 100 is stopped (time T3).

At this time, because the count value indicated by the count signal is larger than the target position count value ("YES" in S110), the count value indicated by the count signal is learned as the new count value corresponding to the indentation bottom position for R (S112). Namely, the target position count value is changed to the new count value corresponding to the indentation bottom position for R.

With the control apparatus for the shift-position changing mechanism 48, the rotation stop positional-range corresponding to each shift position is learned based on the amount by which the actuator has been rotated since the control over the actuator 42 is stopped by the SBW-ECU 40. In this way, the rotation stop positional-range corresponding to each shift position is accurately detected. Accordingly, the accuracy of the control over the rotation stop position of the actuator 42 is enhanced. It is therefore possible to provide the control apparatus and method for the shift-position changing mechanism 48, which accurately detect the rotation stop position of the actuator 42.

The control apparatus according to the invention may be applied to any one of an automatic transmission that executes the gear control in which the gear corresponding to the shift-position selected by the driver is used, and an automatic transmission that executes the shift-range control in which the gear corresponding to the shift-position selected by the driver and the gears lower than the selected gear are all used.

The embodiment of the invention that has been described in the specification is to be considered in all respects as illustrative and not restrictive. The technical scope of the invention is defined by claims, and all changes which come within the meaning and range of equivalency of the claims are therefore intended to be embraced therein.

What is claimed is:

1. A control apparatus for a shift-position changing mechanism that changes shift positions of an automatic transmission mounted in a vehicle using a rotational force of an actuator based on a signal corresponding to a state of an operation member, comprising:
    a mechanism that generates a rotational force for moving the actuator toward a rotation stop positional-range corresponding to the shift position, based on a rotation stop position of the actuator;
    a detection unit that detects a rotation amount of the actuator, which is an amount by which the actuator is rotated by the rotational force of the actuator and the rotational force for moving the actuator toward the rotation stop positional-range corresponding to the shift position;
    a control unit that controls the actuator based on the signal and the detected rotation amount; and
    a learning unit that learns the rotation stop positional-range corresponding to the shift position, based on an amount by which the actuator has been rotated after a control over the actuator executed by the control unit is stopped.

2. The control apparatus according to claim 1, wherein the control unit converts the signal and the detected rotation amount into numerical values, and the control unit controls the actuator using the numerical values.

3. The control apparatus according to claim 2, wherein the control unit stops the control over the actuator, when a difference between the numerical values becomes smaller than a predetermined value.

4. The control apparatus according to claim 1, wherein
the actuator is a rotary electric device, and generates the rotational force of the actuator when supplied with electric power, and
the control unit stops the control over the actuator by shutting off electric power supply to the actuator.

5. The control apparatus according to claim 4, wherein
the control unit converts the signal and the detected rotation amount into numerical values, and
the control unit controls the actuator using the numerical values.

6. The control apparatus according to claim 5, wherein the control unit stops the control over the actuator, when a difference between the numerical values becomes smaller than a predetermined value.

7. The control apparatus according to claim 1, wherein
the mechanism that generates the rotational force includes a restriction member that restricts a rotation range of the actuator; and
the learning unit learns the rotation stop positional-range corresponding to the shift position, using, as a reference, a predetermined position of the rotation range of the actuator restricted by the restriction member.

8. The control apparatus according to claim 7, wherein
the control unit converts the signal and the detected rotation amount into numerical values, and
the control unit controls the actuator using the numerical values.

9. The control apparatus according to claim 8, wherein the control unit stops the control over the actuator, when a difference between the numerical values becomes smaller than a predetermined value.

10. The control apparatus according to claim 8, wherein the signal and the detected rotation amount are converted into the numerical values, using, as a reference, a predetermined position of the rotation range of the actuator restricted by the restriction member.

11. A control method for a shift-position changing mechanism that changes shift positions of an automatic transmission mounted in a vehicle using a rotational force of an actuator based on a signal corresponding to a state of an operation member, comprising:
generating a rotational force for moving the actuator toward a rotation stop positional-range corresponding to the shift position, based on a rotation stop position of the actuator;
detecting a rotation amount of the actuator, which is an amount by which the actuator is rotated by the rotational force of the actuator and the rotational force for moving the actuator toward the rotation stop positional-range corresponding to the shift position;
controlling the actuator based on the signal and the detected rotation amount; and
learning the rotation stop positional-range corresponding to the shift position, based on an amount by which the actuator has been rotated after a control over the actuator is stopped.

12. The control method according to claim 11, further comprising:
converting the signal and the detected rotation amount into numerical values; and
controlling the actuator using the numerical values.

13. The control method according to claim 12, wherein the control over the actuator is stopped, when a difference between the numerical values becomes smaller than a predetermined value.

14. The control method according to claim 11, wherein
the actuator is a rotary electric device, and generates the rotational force of the actuator when supplied with electric power, and
the control over the actuator is stopped by shutting off electric power supply to the actuator.

15. The control method according to claim 14, further comprising:
converting the signal and the detected rotation amount into numerical values; and
controlling the actuator using the numerical values.

16. The control method according to claim 15, wherein the control over the actuator is stopped, when a difference between the numerical values becomes smaller than a predetermined value.

17. The control method according to claim 11, further comprising:
restricting a rotation range of the actuator; and
learning the rotation stop positional-range corresponding to the shift position, using, as a reference, a predetermined position of the restricted rotation range of the actuator.

18. The control method according to claim 17, further comprising:
converting the signal and the detected rotation amount into numerical values; and
controlling the actuator using the numerical values.

19. The control method according to claim 18, wherein the control over the actuator is stopped, when a difference between the numerical values becomes smaller than a predetermined value.

20. The control method according to claim 18, wherein the signal and the detected rotation amount are converted into the numerical values using, as the reference, the predetermined position of the restricted rotation range of the actuator.

* * * * *